US006800971B1

(12) United States Patent
Mangold et al.

(10) Patent No.: US 6,800,971 B1
(45) Date of Patent: Oct. 5, 2004

(54) STARTER GENERATOR FOR AN INTERNAL COMBUSTION ENGINE AND METHOD OF PRODUCING SAME

(75) Inventors: Torsten Mangold, Backnang (DE); Nicole Wehrle, Remseck (DE); Juergen Glauning, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,656

(22) PCT Filed: May 17, 2000

(86) PCT No.: PCT/DE00/01585

§ 371 (c)(1),
(2), (4) Date: Mar. 15, 2001

(87) PCT Pub. No.: WO00/74217

PCT Pub. Date: Dec. 7, 2000

(30) Foreign Application Priority Data

Jun. 1, 1999 (DE) .......................................... 199 25 114
Feb. 11, 2000 (DE) .......................................... 100 06 002

(51) Int. Cl.[7] .............................. H02K 9/00; H02K 9/20; H02K 9/06
(52) U.S. Cl. .............................. 310/52; 310/54; 310/58; 310/60 R
(58) Field of Search .............................. 310/54, 52, 53, 310/65, 61, 55–59, 60 R, 60 A

(56) References Cited

U.S. PATENT DOCUMENTS

| | | | | |
|---|---|---|---|---|
| 3,652,881 A | * | 3/1972 | Albright et al. | 310/57 |
| 3,681,628 A | * | 8/1972 | Krastchew | 310/54 |
| 3,939,368 A | * | 2/1976 | Albaric et al. | 310/43 |
| 3,963,950 A | * | 6/1976 | Watanabe et al. | 310/179 |
| 4,692,644 A | * | 9/1987 | Lenz et al. | 228/193 |
| 4,797,588 A | * | 1/1989 | Capion | 310/54 |
| 4,853,554 A | | 8/1989 | Hartwig | 290/46 |
| 4,864,173 A | * | 9/1989 | Even | 188/158 |
| 5,041,749 A | * | 8/1991 | Gaser et al. | 310/156.22 |
| 5,103,127 A | | 4/1992 | Peter | 310/113 |
| 5,731,647 A | * | 3/1998 | Schuller et al. | 310/114 |
| 5,798,587 A | * | 8/1998 | Lee | 310/52 |
| RE36,038 E | * | 1/1999 | Nakamura et al. | 310/214 |
| 5,886,433 A | * | 3/1999 | Oda et al. | 310/58 |
| 5,939,813 A | * | 8/1999 | Schob | 310/254 |
| 6,127,764 A | * | 10/2000 | Torok | 310/269 |
| 6,153,957 A | * | 11/2000 | Takano | 310/71 |
| 6,222,289 B1 | * | 4/2001 | Adames | 310/54 |
| 6,288,460 B1 | * | 9/2001 | Fakult et al. | 310/179 |
| 6,313,556 B1 | * | 11/2001 | Dombrovski et al. | 29/596 |

FOREIGN PATENT DOCUMENTS

DE   197 49 108 A   4/1999

* cited by examiner

Primary Examiner—Burton S. Mullins
Assistant Examiner—Julio Gonzalez
(74) Attorney, Agent, or Firm—Michael J. Striker

(57) ABSTRACT

The invention relates to a starter generator for an internal combustion engine having a rotor and a stator, whose structural elements substantially comprise stacked, joined-together metal sheets.

9 Claims, 5 Drawing Sheets

Figure 1:
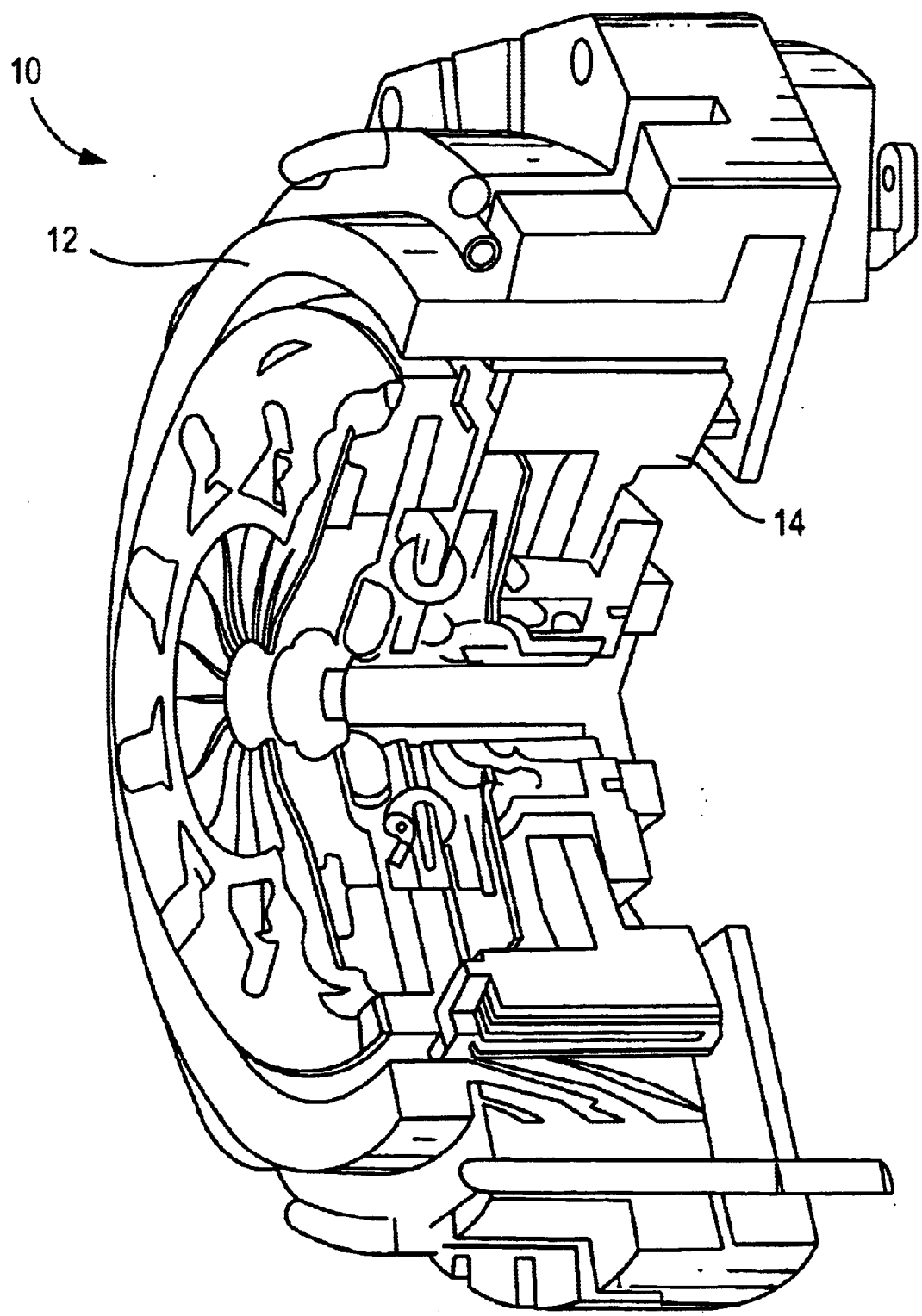

STARTER GENERATOR FOR AN INTERNAL COMBUSTION ENGINE AND METHOD OF PRODUCING SAME

The invention relates to a starter generator for an internal combustion engine and to a method for producing it, as defined by the characteristics recited in claims 1 and 9.

PRIOR ART

From the prior art, starting systems for internal. combustion engines are known that as a rule comprise a battery-operated DC motor (starter generator) as well as switch gear and control units. For starting the engine, a torque is transmitted by the starter generator. Otto engines in general require rotary speeds of 60–100 rpm, and diesel engines require rotary speeds of approximately 80–200 rpm. In the course of progressive reductions in weight and installation space as well as improvements to the starting power, numerous modifications of the starter system have been developed. For instance, in so-called layshaft starters, by means of one additional gear stage, a total step-up of an armature torque generated by the starter generator can be increased. However, the need still exists to reduce weight and installation space, improve cooling power or recycling capability, and reduce the number of structural elements. Advantageous modifications of the starter generator are therefore desired.

ADVANTAGES OF THE INVENTION

According to the invention, with the aid of the starter generator and the method for producing it having the characteristics recited in independent claims 1 and 9, an especially simple, economical production method on the one hand and a starter generator of reduced weight and installation space that is especially easy to adapt to customer requirements on the other can be made available. The starter generator has a rotor and a stator, whose structural elements substantially comprise stacked, joined-together metal sheets.

According to the method, the metal sheets that form the stator and the rotor are connected to one another by joining. The joining can be done by punch packing, welding, adhesive bonding or riveting. The individual metal sheets are pretreated and stacked on one another in such a way that the essential structural elements of the two components are at least maximally preshaped.

Preferably, the structural elements of the rotor, individually or combined, include a hub, a bearing seat, and a sensor ring for detecting rpm and/or the direction of rotation. If in addition short-circuit bars and/or short-circuit rings are created on the rotor, this can preferably be done by aluminum casting or copper casting.

With a suitable geometry of the metal sheets that form a stator after being joined, in particular such structural elements as a pin bore, a bore pattern and a cooling system can be created directly. In a preferred variant, part of the cooling system is formed by recesses on the outer edge of the stator. The recesses then serve in an ensuing production step to receive cooling tubes. In a preferred feature of such a cooling system, the cooling tubes have knurling on their tube surface, which increases a retention force on a base body of the stator. For permanent fixation to the stator, the cooling tubes can also be press-fitted in it, or can initially merely be placed in the recess of the stator and then widened by means of a mandrel.

Alternatively or in a combination for this purpose, the cooling system can be accommodated in the interior of the stator (internal cooling), or the jacket faces of the cooling system are formed by an external edge of the stator and a gear bell that receives the stator (external cooling). For sealing off the cooling system, a sealing means, such as an electroplated coating, a heat-resistant and coolant-resistant paint, or a synthetic resin can be applied in the region of the jacket faces of the cooling system.

Further preferred features of the invention will become apparent from the other characteristics recited in the dependent claims.

DRAWINGS

Figure 2A:
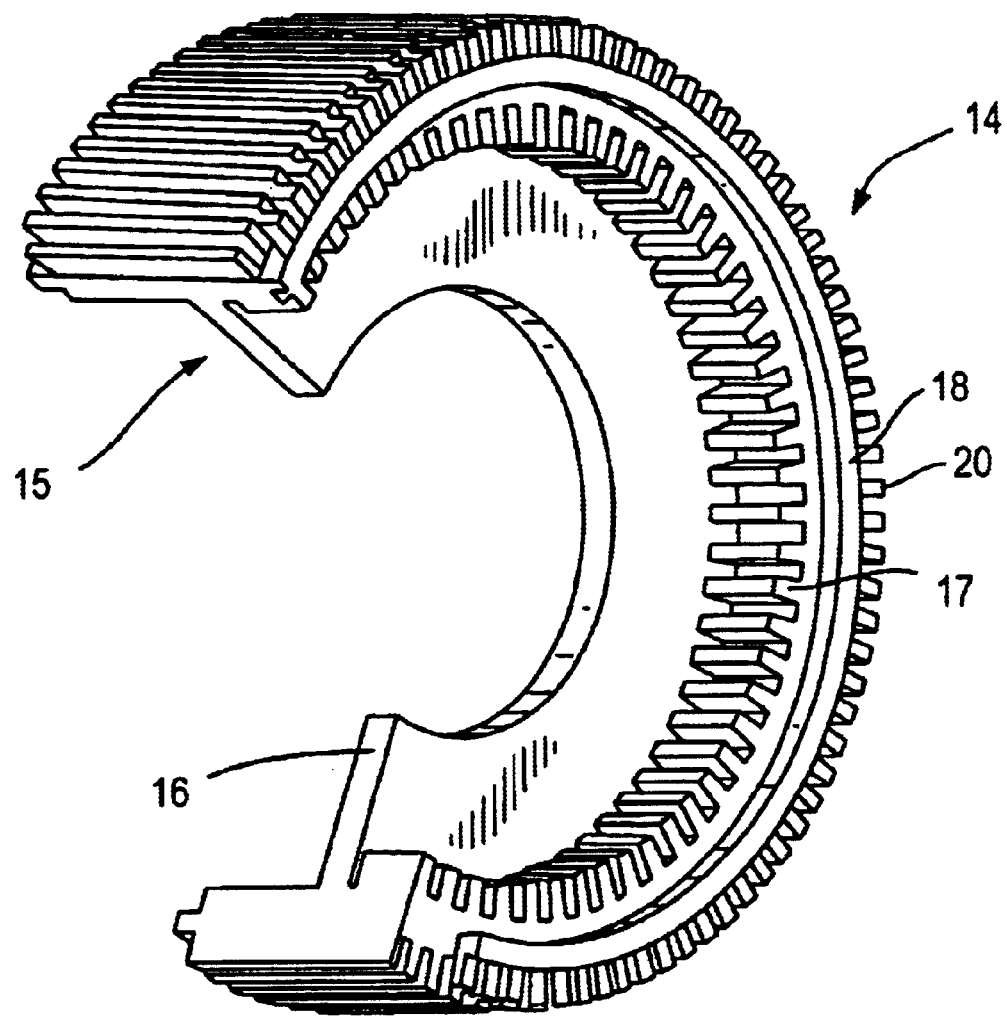
Figure 2B:
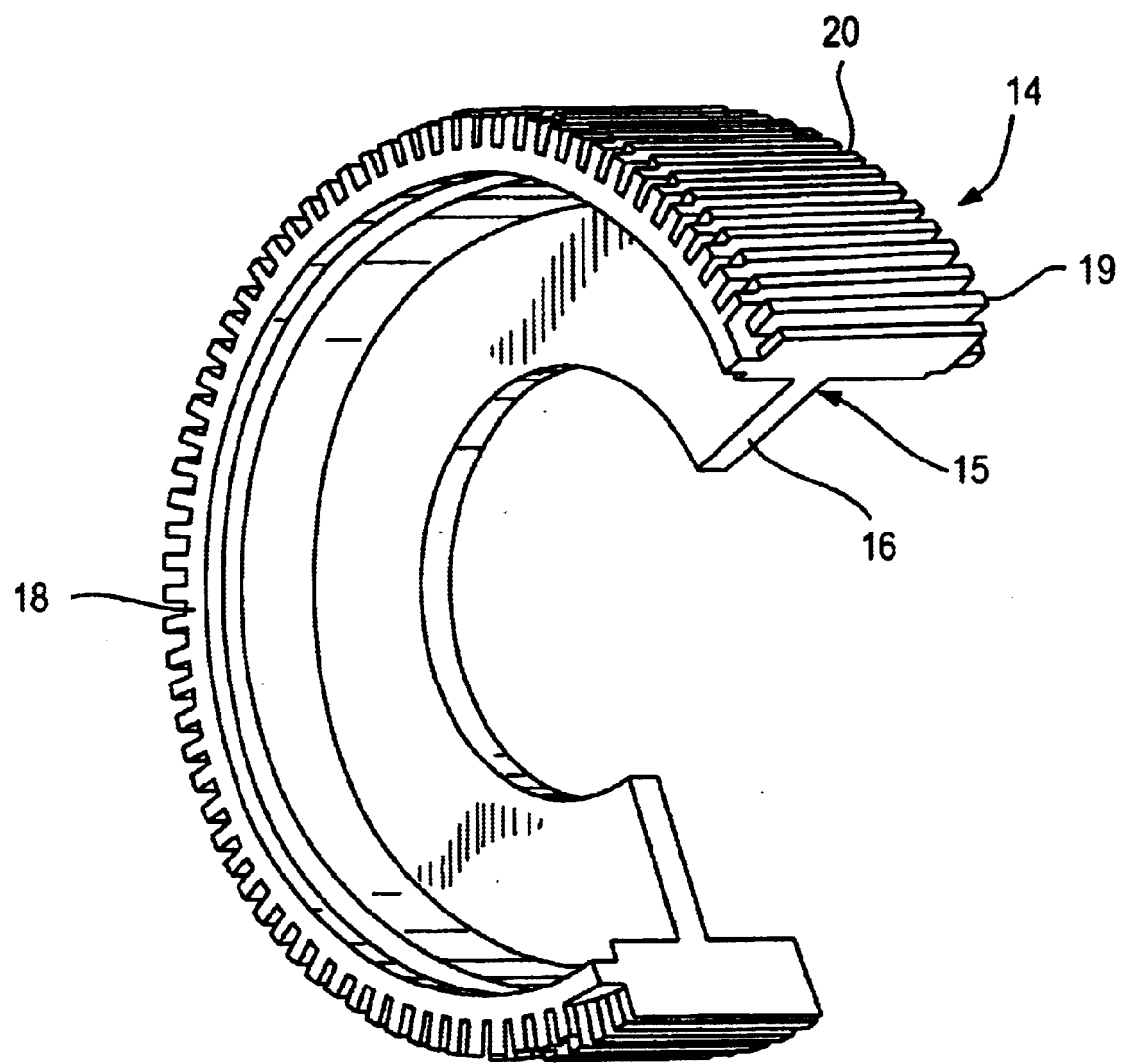
Figure 3:
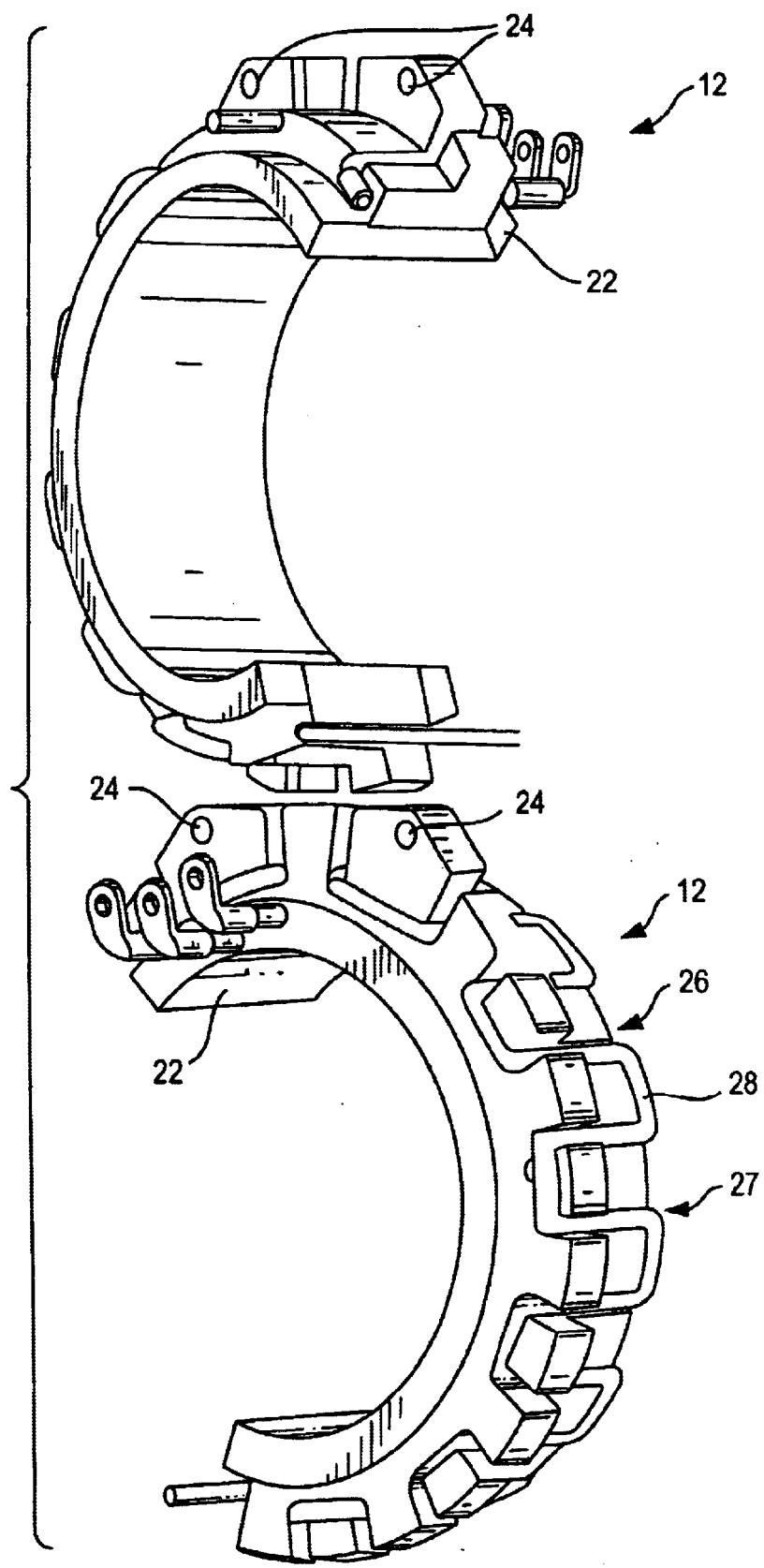
Figure 4:
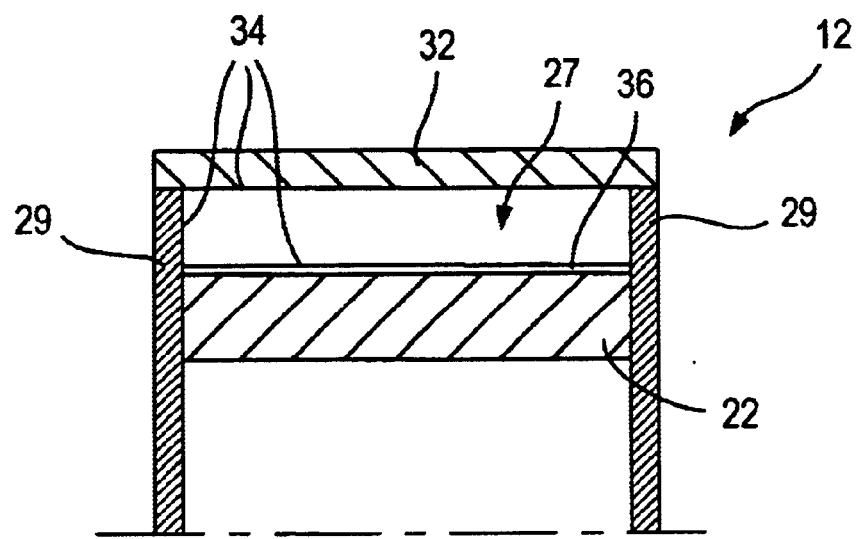
Figure 5:
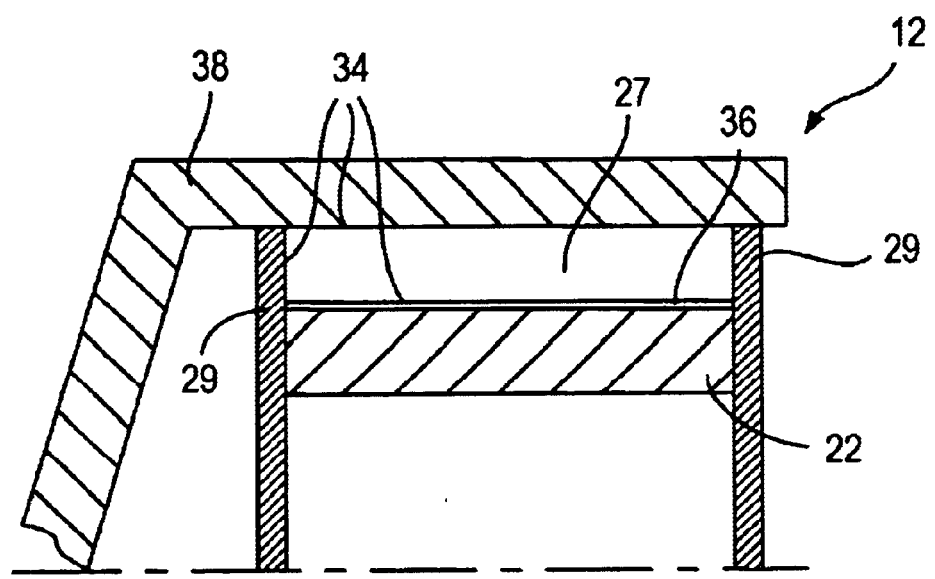

The invention will be described in further detail below in terms of exemplary embodiments in conjunction with the associated drawings. Shown are:

FIG. 1, one version of a starter generator in the form of an asynchronous machine, in a fragmentary perspective view;

FIG. 2, two fragmentary perspective views of a stator with a cooling system;

FIG. 3, two fragmentary perspective views of a rotor;

FIG. 4, a schematic sectional view of one region of a stator with internal cooling; and FIG. 5, a schematic sectional view of one region of a stator with external cooling.

DESCRIPTION OF THE EXEMPLARY EMBODIMENT

FIG. 1 shows a starter generator 10 as it is mounted in the drive train between a crank shaft of an internal combustion engine and a downstream gear. This kind of crank shaft starter generator 10 can be designed as an asynchronous machine and typically comprises a stator 12 and a rotor 14 supported so as to be movable relative to it.

In FIG. 2, two fragmentary perspective views of the rotor 14 are shown. A base body 15 of the rotor 14 is produced by joining different metal sheets, for instance by means of punch packing technology. The base body 15 already contains all the essential structural elements of the rotor 14. Thus its geometry is defined in such a way that a bearing seat 16 forms on the inside diameter of the metal sheets of the rotor. The base body 15, on an inside, also has a radially inward-oriented set of teeth 17, which by way of example can be a starting point for detection of rpm and/or the direction of rotation using a sensor ring. On an outside of the base body 15, a further set of teeth 19 is created by means of a suitable embodiment of the metal sheets that form the base body 15. Short-circuit elements, such as a short-circuit ring 18 and short-circuit bars 20, can be cast integrally onto this set of teeth 19 or so as to mesh with it. Recourse may be had to a copper or aluminum casting technique known per se; the first method makes a more favorable electrical efficiency possible. These methods can be performed directly on the base body 15.

The stator 12, shown in two different perspective views in FIG. 3, is likewise produced by stacking and joining different metal sheets. Once again, essential components of the stator 12 can be formed in one production process in this way. To that end, a base body 22 of the stator 12 already has a bore pattern required for receiving the rotor 14 by the time the individual metal sheets have been joined together. Furthermore, pin bores 24 and recesses 26 for receiving a cooling tube 28 (cooling system 27) can also be present. A heat transfer from the stator base body 22 to the cooling tube 28 can be improved by such provisions as knurling of the tube surface, press-fitting of the cooling tube 28 into the stator packet, or placing the cooling tube 28 in the stator packet and then widening it with a mandrel. Overall, local conditions can be taken into proper account quite flexibly in this way.

In FIGS. 4 and 5, two further alternative cooling systems 27 for the stator 12 are shown, each in a schematic quarter-sectional view. Internal cooling (FIG. 4) can be realized by providing that the base body 22 is welded in the axial direction to two equal-sized metal end plates 29. An outer jacket face of the cooling system 27 is formed via a tubular segment 32 welded to the metal end plates 29. To assure tightness of the cooling system 27 with regard to a coolant liquid flowing through it in operation, a sealing means 36 is applied in the region of the jacket faces 34. The sealing means 36 may be an electroplated coating, a heat-resistant and coolant-resistant paint, or synthetic resin. Overall, by this kind of integrated cooling, a structural volume and weight of the stator 12 can be reduced. Furthermore, its recycling capability is enhanced by the illustrated limitation in the number of materials used, and cooling can be done with an especially favorable heat transfer.

Instead of the tubular segment 32, it is also possible, in a further alternative version of the stator 12, to use a wall 38 of a gear bell that receives the stator 12. If such an embodiment meets local requirements of the starter generator 10, a further weight reduction can then be attained in this way.

What is claimed is:

1. A starter generator for an internal combustion engine, comprising a rotor and a stator each composed of structural elements, the structural elements comprising layered and joined together metal sheets which are stacked on one another so that the structural elements of the rotor and the stator are at least maximally preshaped, the metal sheets of the stator having a suitable geometry for creating the stator directly, the rotor having a base body which contains all essential structural elements of the rotor each comprising the metal sheet, the structural elements of the starter including a cooling system with a first cooling system accommodated in an interior of the stator to provide internal cooling, and a second cooling system with a part having pin bores and recesses on an outer edge of the stator for receiving cooling tubes for external cooling.

2. The starter generator of claim 1, wherein the structural elements of the rotor (14) include a hub, a bearing seat (16), and a sensor ring for detecting rpm and/or the direction of rotation.

3. The starter generator of claim 1, wherein for sealing off the cooling system (27), a sealing means (36) is applied in the region of the jacket faces (34) of the cooling system (27).

4. The starter generator of claim 3, wherein the sealing means (36) is an electroplated coating, a heat-resistant and coolant-resistant paint, or a synthetic resin.

5. The starter generator as defined in claim 1, wherein the metal sheets are formed as sheets selected from the group consisting of punch packed, welded, adhesively bonded and riveted metal sheets.

6. The starter generator as defined in claim 1, wherein the cooling tubes (28) are formed as cooling tubes which are pressed-fitted into the stator.

7. The starter generator as defined in claim 1, wherein the cooling tubes (28) have a knurling on their tube surface.

8. The starter generator as defined in claim 1, wherein the cooling tubes (28) are placed in the recesses (26) of the stator (12) and then widened by a mandrel.

9. The starter generator as defined in claim 1, wherein the first cooling system for internal cooling is accommodated on an outer edge of the stator and has an outer jack face formed by a wall of a gear bell which receives the stator.

* * * * *